(12) United States Patent
Tsiberidis

(10) Patent No.: US 8,800,611 B2
(45) Date of Patent: Aug. 12, 2014

(54) INSERT ELEMENT FOR A CONTAINER SUITABLE FOR FILLING WITH UREA AT A FILLING STATION

(75) Inventor: Konstantinos Tsiberidis, Heilbronn (DE)

(73) Assignee: Tecinnovation GmbH, Ratingen (DE)

( * ) Notice: Subject to any disclaimer, the term of this patent is extended or adjusted under 35 U.S.C. 154(b) by 748 days.

(21) Appl. No.: 12/996,762

(22) PCT Filed: Jun. 9, 2009

(86) PCT No.: PCT/EP2009/057084
§ 371 (c)(1),
(2), (4) Date: Dec. 7, 2010

(87) PCT Pub. No.: WO2009/150149
PCT Pub. Date: Dec. 17, 2009

(65) Prior Publication Data
US 2011/0100985 A1    May 5, 2011

(30) Foreign Application Priority Data

Jun. 9, 2008 (DE) .......................... 10 2008 027 463
Sep. 26, 2008 (DE) .......................... 10 2008 049 150

(51) Int. Cl.
*B65B 1/04* (2006.01)
*B65B 3/00* (2006.01)
*B60K 15/04* (2006.01)

(52) U.S. Cl.
CPC ...................................... *B60K 15/04* (2013.01)
USPC ......................................... 141/350; 220/86.2

(58) Field of Classification Search
CPC ........................................................ B60K 15/04
USPC .............................. 141/350, 94, 95; 220/86.2
See application file for complete search history.

(56) References Cited

U.S. PATENT DOCUMENTS

| 3,730,216 | A  | * | 5/1973  | Arnett et al. ................... 137/588 |
| 6,374,868 | B1 | * | 4/2002  | Channing ......................... 141/9 |
| 7,182,111 | B2 | * | 2/2007  | McClung et al. ............. 141/352 |
| 7,302,977 | B2 | * | 12/2007 | King et al. ..................... 141/367 |
| 7,621,303 | B2 | * | 11/2009 | Buchgraber ................... 141/350 |
| 7,644,740 | B2 | * | 1/2010  | Benjey et al. ................. 141/350 |
| 7,661,550 | B2 | * | 2/2010  | Feichtinger ................... 220/86.2 |
| 7,665,493 | B2 | * | 2/2010  | Groom et al. ................. 141/350 |
| 7,967,042 | B2 | * | 6/2011  | Groom et al. ................. 141/367 |

(Continued)

FOREIGN PATENT DOCUMENTS

EP            1502794 A2 *  2/2005  ............. B60K 15/04

OTHER PUBLICATIONS

Martin Clasen, International Search Report for PCT/EP2009/057084, May 20, 2010.

*Primary Examiner* — Timothy L Maust
(74) *Attorney, Agent, or Firm* — Chernoff, Vilhauer, McClung & Stenzel, LLP

(57) ABSTRACT

The invention relates to an insert element 13 for inserting into the filler neck 10 of a tank suitable for filling with urea at a filling station by means of a pump nozzle 12. The insert element 13 comprises a cover element 24 with an opening having an inner diameter that is smaller than the outer diameter of a standard pump nozzle spout 12 for Diesel fuel, and support means for mounting the cover element 24 to substantially the plane of opening of the filler neck 10.

26 Claims, 5 Drawing Sheets

(56) References Cited

U.S. PATENT DOCUMENTS

| | | | |
|---|---|---|---|
| 8,235,078 B2 * | 8/2012 | Horlacher et al. | 141/350 |
| 2008/0041492 A1 * | 2/2008 | Gabbey et al. | 141/350 |
| 2009/0321441 A1 | 12/2009 | Horlacher et al. | |
| 2010/0006178 A1 * | 1/2010 | Muth et al. | 141/350 |
| 2010/0212780 A1 * | 8/2010 | Sato et al. | 141/350 |
| 2011/0315682 A1 * | 12/2011 | Tsiberidis | 220/86.2 |

* cited by examiner

Fig.3
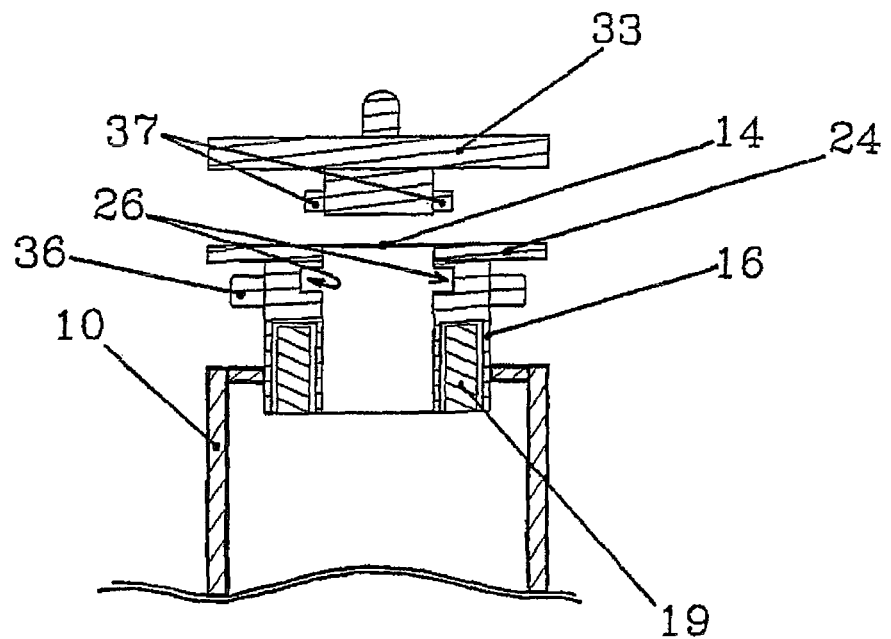
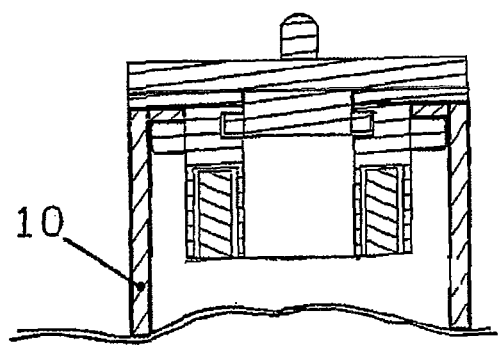

Fig.6
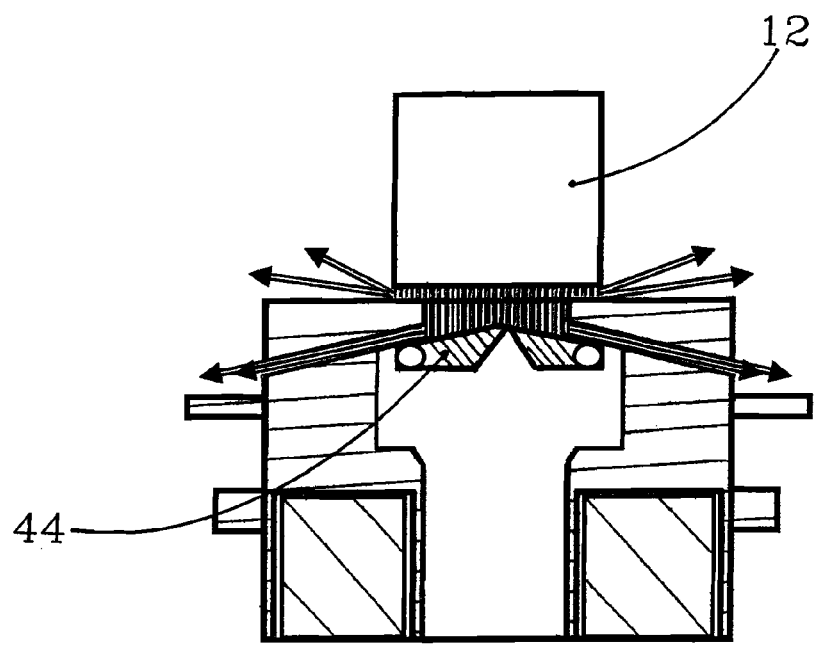
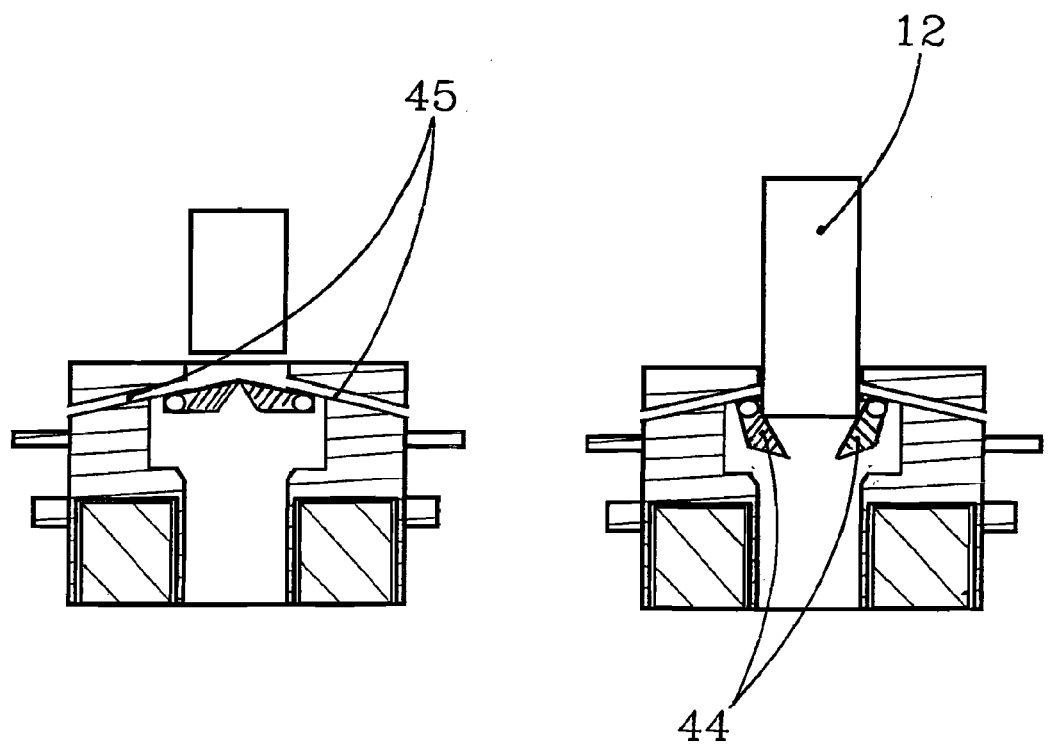

INSERT ELEMENT FOR A CONTAINER SUITABLE FOR FILLING WITH UREA AT A FILLING STATION

This is a national stage application filed under 35 USC 371 based on International Application No. PCT/EP2009/057084 filed Jun. 9, 2009, and claims priority under 35 USC 119 of German Patent Application Nos. DE 102008027463.1 filed Jun. 9, 2008 and DE 102008049150.0 filed Sep. 26, 2008.

The invention relates to an insert element for a tank provided with a filler opening suitable for filling with urea at a filling station by means of a pump nozzle. The invention relates furthermore to a tank having one such insert element designed to prevent fuel from being inadvertently filled into the urea tank.

In prior art, nitrous oxides emitted in engine operation are reduced, among other things, by selective catalytic reduction involving directing the engine exhaust gases through a selective catalytic reduction (SCR) catalyst. To chemically convert the nitrous oxides the SCR catalyst is operated with a highly pure, urea solution as clear as water. This liquid solution of urea standardized by DIN is marketed under the name ADBLUE.

The increasing demand for this urea solution has resulted in more and more filling stations offering it at the pumps. For use of urea solution an additional tank is provided on the vehicle which can be filled in the same way as with a fuel pump nozzle.

Since a variety of different fuels as well as urea solution are on offer at the filling station there is a risk of the one being confused with the other. This risk is predominant with urea and Diesel fuel since the aforementioned SCR catalysts are mainly provided in conjunction with large-volume Diesel engines of trucks, for example, because a urea tank needs to be provided, taking up additional space and adding to the weight of the vehicle.

To make it impossible for urea solution to be inadvertently filled into the fuel tank an automatic magnetic valve is provided in the urea pump nozzle on the inside of the spout which in the resting position closes off the spout opening. This makes it impossible to fill urea solution even when the pump nozzle is actuated with the magnetic valve closed. To activate a flow of urea through the pump nozzle a magnetic adapter must be provided in the opening of the filler neck of a tank intended for urea solution. This magnetic adapter opens the magnetic valve therein in passage of the spout of a urea pump nozzle. Once the magnetic valve is open the urea can flow from the spout of the pump nozzle.

Whilst, as explained above, filling the urea into the Diesel tank is impossible because of the magnetic valve being closed in the pump nozzle, inversely filling the urea tank with Diesel is prevented in prior art by the filling opening being dimensioned so small that the spout of a Diesel pump nozzle cannot pass through the opening. For this purpose exclusive use is made of urea pump nozzles featuring a smaller diameter spout than that of a standardized Diesel pump nozzle. Currently, this smaller spout diameter on urea pump nozzles corresponds to that of standard gasoline (petrol) pump nozzles. To prevent a larger diameter Diesel pump nozzle having a larger spout being inadvertently inserted into the urea tank the magnetic adapter provided in the filler neck of the urea tank features a filler opening, the diameter of which is smaller than that of the Diesel pump nozzle spout whilst being sufficiently large to permit insertion of a pump nozzle having a 19 mm spout.

The drawback of this prior art achievement is, however, the positioning of the magnetic adapter being too deep in the filler neck of the urea solution tank so that a conventional filler neck can be capped by a conventional bayonet tank cap. When a Diesel pump nozzle is introduced into the filler neck of the urea solution tank and the pump nozzle spout inserted down to the opening of the magnetic adapter, pressing the pump nozzle can result in sufficient Diesel fuel collecting in the filler neck up to the top filler opening, this collection of Diesel fuel then, of course, running into the urea solution tank.

This is why the object of the invention is to provide an improved achievement to safeguard proper filling of urea solution tanks which, where necessary, also permits retrofitting to existing tanks.

This object is achieved by now providing an insert element having a cover element with an opening having an inner diameter that is smaller than the outer diameter of a standard pump nozzle spout for Diesel fuel, and support means for mounting the cover element to substantially the plane of opening of the filler neck.

The gist of the invention is thus to rim the filler opening—as viewed in the longitudinal direction thereof—with a cover element capable of preventing Diesel fuel collecting upstream of the cover element which could otherwise flow into the urea solution tank. In other words, since the cover element is arranged in accordance with the invention in the opening plane of the filler neck no Diesel fuel can collect upstream of the cover element even when a Diesel pump nozzle is inadvertently activated, because the Diesel fuel is now instantly expelled to the ground, making it immediately obvious that there has been a mix-up in filling to prompt a discontinuation before even a minimum amount of wrong fuel can find its way into the urea solution tank.

In its simplest achievement the invention includes an insert element in the form of a cover element suitable to cap the filler neck by being retained in the opening plane thereof by the cylindrical rim of the cap. For this purpose the insert element features an opening which permits insertion of a urea pump nozzle spout but not the spout of a Diesel pump nozzle.

So that such an insert element can also be capped, it features at its end facing away from the tank a male coupling for screwing on a cap of the insert element. In this arrangement it is necessary that the inner diameter of the male coupling is required to flush close the opening of the cover element 24, for then namely, the inner face of the male coupling forms with the opening of the cover element a cylindrical wall extending full-length of the insert element. With this embodiment this also ensures that nothing can collect between the cover element and the inner wall of the male coupling.

It is advantageous to provide either the screw thread of the cap or the screw thread of the male coupling with a so-called ascending thread to create a resistance to the cap becoming loose on the male coupling, i.e. it only being releasable by intentional manual turning. As an alternative, an achievement is proposed in which the rim of the opening of the cover element features two recesses facing each other into which two tabs provided on the underside of the cap can engage to form a bayonet lock between the cap and the reducer.

In one advantageous aspect the insert element in accordance with the invention comprises a reducer which can be shift-mounted in the filler neck of the tank and in which, to advantage, a magnet can be mounted to interact with a magnetic switch included in a urea pump nozzle, i.e. to open it. This embodiment does away with the magnetic adapter located deep down in the filler neck in prior art. This achievement with a magnetic adapter integrated in the reducer ensures reliably switching of the magnetic valve in the pump nozzle because it may happen that the already installed magnetic adapter is positioned so deep in the filler neck that it is no longer capable of producing the necessary switching action on insertion of a urea solution pump nozzle, because the latter can no longer be inserted so far as originally intended, i.e. without an insert element. Then, to create a flow of urea the magnet needs to be positioned nearer to the cover element as is achieved by this embodiment of an integrated magnetic adapter in the reducer.

In this arrangement the depth of the reducer by which the insert element protrudes into the filler neck is dimensioned so that an already fitted magnetic adapter is not contacted. This is particularly necessary when a urea tank already provided with a magnetic adapter is to be retrofitted with the insert element in accordance with the invention.

In another advantageous aspect the reducer is male threaded for screwing the reducer into the filler neck of the tank.

In an alternative embodiment it is provided for that the reducer features tabs forming together with the cap locking element of the filler neck a bayonet lock. In this arrangement, when fitting the insert element, the cover element is urged against the rim of the filler neck, sealing it off tight. For this purpose it is particularly an advantage to dispose between the cover element and rim a seal supported by the cover element.

In yet another advantageous aspect including a reducer, the reducer features at its filler opening end a bayonet recess, meaning that two recesses facing each other are provided in the rim of the opening of the cover element for mating two tabs bottoming the cap so that, again a bayonet lock is formed between cap and reducer.

The cap can be held captive to the reducer or cover element by means of a cable retainer, or the like, to prevent its loss.

Since when tanking urea the air in the tank has to escape and because the tolerances on adapting a predefined pump nozzle with a reduced spout are tight, it is to advantage that axial longitudinal recesses are provided in the inner wall of the reducer so that between a urea pump nozzle inserted in the insert element and the reducer air can escape to the atmosphere from the interior of the tank. In this arrangement the recesses are dimensioned as a function of the flow of urea solution into the tank with which the person skilled in the art is familiar.

In still a further advantageous aspect the insert element features a special tab wrench engineered to mate with the cited recesses or bayonet recess of the cover element to rotationally lock the insert element to a filler neck.

In conclusion, it may be provided for that the insert element is rendered theft-proof by means of a screw to lock the insert element to the filler neck by screwing the screw into a tapping provided transversely to the centerline of the reducer.

To finish with, the invention relates also to a tank for urea as a motor vehicle tank having a filler neck fitted with an insert element as described above. In this arrangement the insert element may be engineered integral with the filler neck.

Furthermore, the invention relates to a jerrycan featuring a filler opening and a lockable, removable cap for closing off the opening, through which with the aid of the pump nozzle in the filling station the opened jerrycan can be filled. In this arrangement the filler opening has a rim located in the plane of the opening, the inner diameter of which is smaller than the outer diameter of the pump nozzle spout as standardized for Diesel fuel, meaning there is no way that the spout of a pump nozzle having too large an outer diameter can be inserted into the jerrycan.

In one advantageous aspect the jerrycan features a magnet beneath the cover element.

To advantage for all variants of the aspects of the insert element of the jerrycan or tank the filler opening is pivotally lidded to pivot aside on insertion of the urea solution pump nozzle spout so that it can be inserted deeper into the tank. This cap is also a safeguard against malicious pollution of the urea system through the opening in the urea solution tank. In another embodiment thereof at least one passage is provided connecting the filler opening to the rim of the filler neck so that any fluid spill of the lid can run off through this passage, i.e. prevented from gaining access to the urea solution tank. This lid may be engineered in one or more parts pivoted spring-loaded to advantage so that the lid in its resting position is positioned to close off the filler opening.

The invention will now be detailed with reference to the attached drawings in which:

FIG. 3 is a view of a further embodiment of the insert element in accordance with the invention

FIG. 6 is a view of one embodiment of the invention featuring a pivoted lid.

Figure 1:
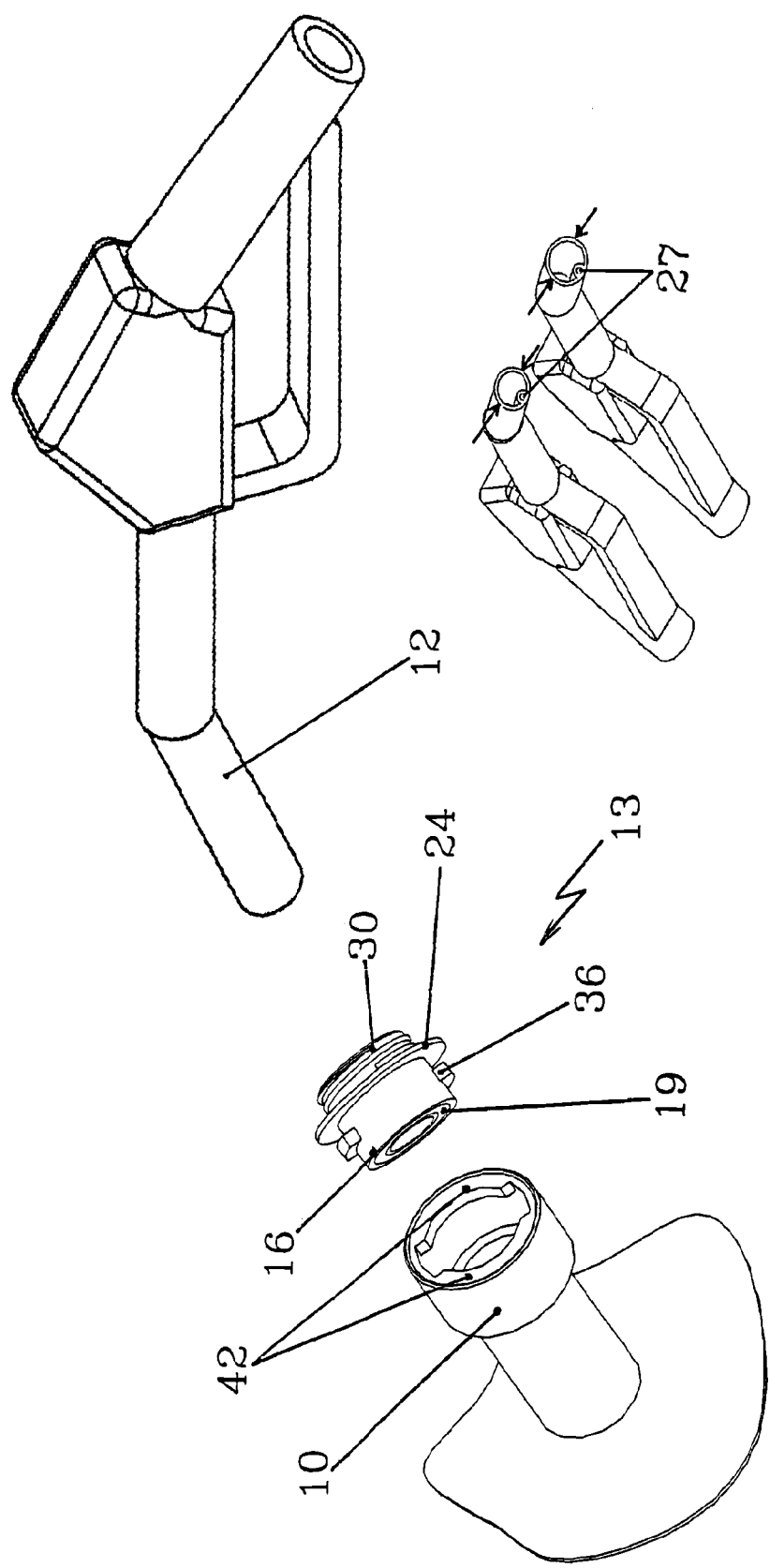
FIG. 1 is a view in perspective of the insert element in accordance with the invention showing how it is located on the filler neck.

Referring now to FIG. 1 there is illustrated a view in perspective of the insert element 13 in accordance with the invention showing how it is located on the filler neck 10 of a tank. The cover element 24 has an insertion opening (not shown in this view in perspective) for insertion of a urea pump nozzle spout whilst preventing the insertion of a Diesel pump nozzle spout. In other words, the cover element has an opening diameter which permits insertion of pump nozzles 12 having a reduced diameter whilst any pump nozzle having a larger spout will not pass through the opening of the cover element. Shown in FIG. 1 in the lower portion of the illustration are two pump nozzles featuring different spouts. The pump nozzle on the left has a spout diameter engineered for standardized urea solution tanking whereas the one on the right is a Diesel pump nozzle having a larger spout diameter. Reference numeral 27 identifies in each case the level control gauge of the pump nozzle for automatically shutting off the pump nozzle when the tank is full.

The filler neck 10 comprises a conventional cap locking element 42 rimming the filler neck. Complementary to said cap locking element 42 with its two recesses each facing the other the insert element comprises two tabs 36, so that the combination of cap locking element 42 with the tabs 36 and the cover element 24 result in a bayonet lock. When fitting the insert element in place the cover element 24 is urged to top the cap locking element 42. A sealing ring (not shown) beneath the cover element creates a tight closure.

So that the insert element 13 itself can be closed off, the cover element 24 is topped by a male coupling 30 onto which the cap (not shown in this illustration) of the insert element can be screwed. In this embodiment with a male coupling 30 it is necessary that its inner diameter closes off the opening of the cover element 24 flush.

In other words, the inner wall of the male coupling 30 then forms with the opening of the cover element 24 a cylindrical wall extending full length of the insert element. This embodiment also ensures that no fluid can collect between the cover element 24 and inner wall of the male coupling 30 and a pump nozzle can only be inserted by the its spout down to the opening plane of the male coupling 30 and not as far as the cover element 24 (see detail in FIG. 2).

Figure 2:
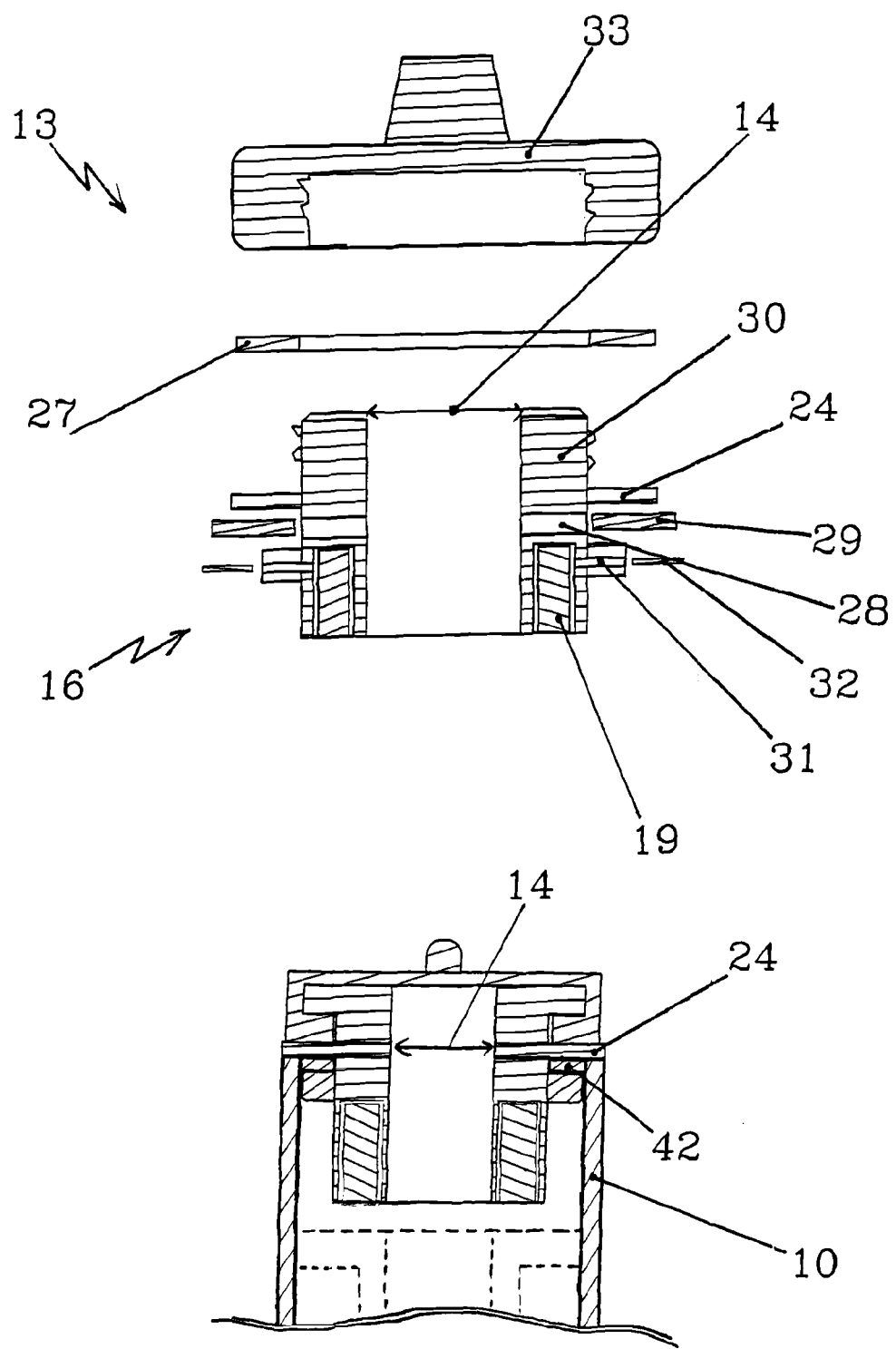
FIG. 2 is an exploded view of one embodiment of the insert element in accordance with the invention, showing it fitted to the filler neck.

Referring now to FIG. 2 there is illustrated in more detail the insert element 13 as shown in FIG. 1. The cap 33 can be screwed onto the male coupling 30, the seal 27 serving to seal the cap tight to the cover element 24. Provided beneath the insert element 13 is a ring-shaped magnet 19 fastened in place by means of locking screws 32 (indicated diagrammatically) screwed into the transverse tappings 31 of the reducer. It is understood, of course, that the magnet may also be secured to the reducer by an adhesive bond or by locking pins and the like. It is also obvious that the shape of the magnet may vary. The opening 14 is dimensioned so that the spout of a urea pump nozzle spout can pass, but not that of a Diesel pump nozzle.

Provided furthermore in the reducer 16 in this embodiment are transverse tappings 28 for receiving the locking screws 29 (indicated diagrammatically) to additionally locate the insert element 13 in the filler neck. The locking screws 29 in the tappings 28 function at the same time as an anti-theft captive feature, so that the insert element can no longer be removed simply by turning the reducer.

Referring now to the lower half of FIG. 2 there is illustrated how the insert element is fitted by the cover element 24 being seated on the cap locking element 42 of the filler neck 10. The broken line in the lower half of this figure indicates the position of a magnetic adapter as may be already pre-installed, making it obvious that for retrofitting in tanks having existing magnetic adapters the insert element 13 in accordance with the invention is allowed to be dimensioned so that it juts into the filler neck only as far as not to come into contact with an existing magnetic adapter.

Referring now to FIG. 3 there is illustrated a further embodiment of the insert element in accordance with the invention showing how the reducer 16 features bayonet recesses 26 for mating the tabs 37 of the cap 33 to form a bayonet lock between cap and reducer. In the top-down view of the reducer, i.e. of its open end, a circle open on two diametrally opposed sides is evident. To advantage the tabs 36 are configured ramped so that the cap is seated tighter the more it is turned, in preventing it from becoming loose due to vibration. Shown in the lower half of FIG. 3 is how this embodiment of the insert element looks when fitted.

In this embodiment it is furthermore achieved to advantage that the cap, because of its low profile, protrudes only minimally from the cover element 24. This low profile of the cap 33 is due to the cap having no screw thread so that the flat of the cap 33 can be engineered slim or low in height.

Figure 4:
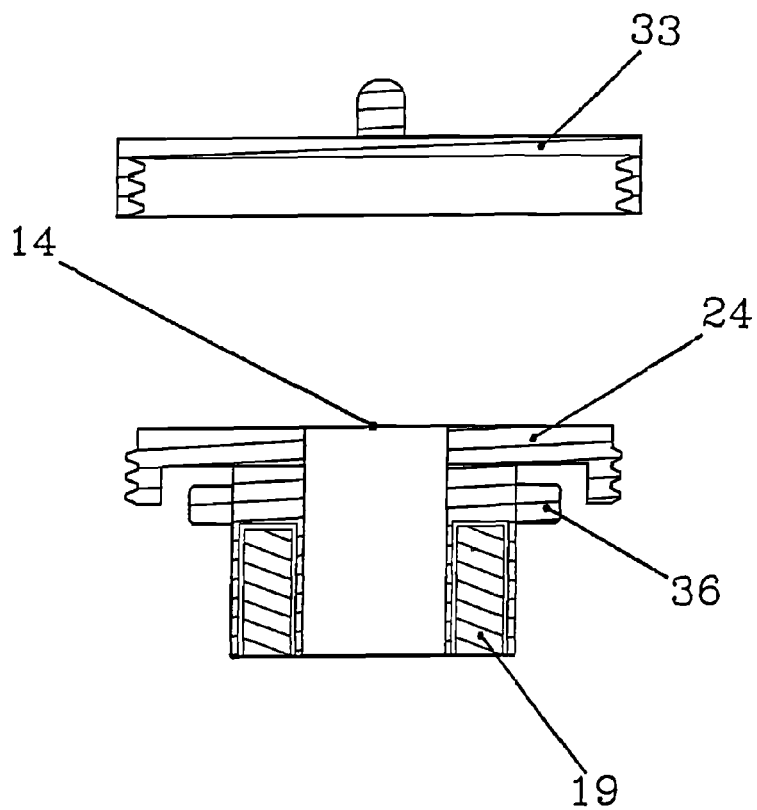
FIG. 4 is a view of a further alternative embodiment of the insert element.

Referring now to FIG. 4 there is illustrated another embodiment of the insert element in which the cover element 24 protrudes beyond the rim of the cap locking element (not shown in FIG. 4) of the filler neck 10 and which has a male screw-thread serving to mate with the female screw-thread of the cap 33.

Figure 5:
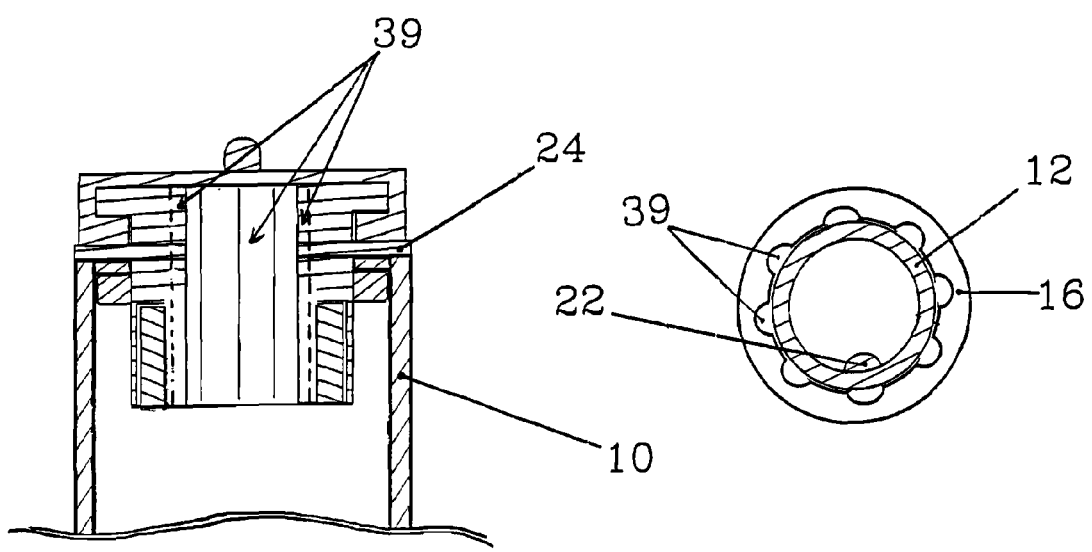
FIG. 5 is a view of another embodiment of the insert element.

Referring now to FIG. 5 there is illustrated yet another embodiment of the insert element in which the reducer features a train of recesses 39 serving to allow the air to escape from the tank even when a pump nozzle is inserted. In the view shown on the right in FIG. 5 the top-down view showing the sectioned pump nozzle 12 of a pump nozzle makes it clearly evident how air can stream through the recesses 39 between the outer wall of the spout and the inner wall of the reducer 16. Reference numeral 22 designates a level control gauge of the pump nozzle.

Referring now to FIG. 6 there is illustrated a last embodiment incorporating a pivoted lid 44 which in this example is engineered two-part, it closing off the filler opening in its resting position. In the upper half of FIG. 6 the diagrammatic view shows what happens when an attempt is made to Diesel fuel the urea solution tank, namely the fuel emerging from the spout flows off without gaining access to the urea solution tank, as is promoted to advantage with the aid of the discharge passage 45. It is not until the spout of an urea solution pump nozzle is inserted that the lid 44 is pivoted aside to permit filling urea solution.

LIST OF REFERENCE NUMERALS 10 filler neck of a tank
12 pump nozzle/spout
13 insert element
14 opening of insert element
16 reducer
19 magnet
22 level control gauge
24 cover element
26 bayonet recess
27 seal
28 locking tapping on filler neck
29 locking screw
30 male coupling
31 locking tapping for magnet
32 locking screw
33 cap
36 bayonet lock tabs
39 recesses
42 cap locking element
44 pivoted lid
45 discharge passage

The invention claimed is:

1. In combination:
   a tank suitable for filling with urea at a filling station by means of a nozzle spout of a urea dispenser, the tank having a filler neck, the filler neck having a rim defining an opening plane of the filler neck, and
   an insert element for inserting into the filler neck of the tank, said insert element comprising a cover element defining an opening plane of the insert element, wherein the cover element is formed with an opening for receiving the nozzle spout of the urea dispenser, said opening extending through the insert element from the opening plane of the insert element for allowing urea dispensed from the nozzle spout of the urea dispenser to flow into the tank, said opening having a diameter, at least at the opening plane of the insert element, that is smaller than the outer diameter of a nozzle spout of a dispenser for Diesel fuel, and a coupling device for attaching the insert element to the tank when the insert element is inserted into the filler neck of the tank,
   and wherein the cover element is located adjacent to the rim of the filler neck and closes the filler neck at the opening plane of the filler neck, except for said opening, when the insert element is located in the filler neck of the tank, to limit flow of Diesel fuel into the tank in the event that a user attempts to dispense Diesel fuel into the tank.

2. The combination as set forth in claim 1, wherein the tank is provided at the interior of the filler neck with an internal thread and the insert element is provided with an external thread for threaded engagement with the internal thread of the filler neck.

3. The combination as set forth in claim 1, wherein the tank is provided at the interior of the filler neck with first bayonet lock formations and the insert element is provided with second bayonet lock formations that cooperate with the first bayonet lock formations to form a bayonet lock for securing the insert element in position in the filler neck.

4. The combination as set forth in claim 1, further comprising a cap, wherein the cover element is provided at an outer end thereof with an external thread for threaded engagement by an internal thread provided on the cap for closing off the opening of the insert element.

5. The combination as set forth in claim 4, wherein the external thread provided at the outer end of the cover element is an ascending thread to create resistance to loosening of the cap.

6. The combination as set forth in claim 4, wherein the internal thread provided on the cap is an ascending thread to create resistance to loosening of the cap.

7. The combination as set forth in claim 1, further comprising a cap, wherein the insert element is provided at the interior of the opening with first bayonet lock formations and the cap is provided with second bayonet lock formations that cooperate with the first bayonet lock formations to form a bayonet lock for securing the cap to the insert element.

8. The combination as set forth in claim 1, wherein the insert element comprises a magnet for interacting with a magnetic switch included in a urea pump nozzle.

9. The combination as set forth in claim 1, wherein the opening of the insert element includes longitudinal recesses that provide a passage for flow of air between a spout of a urea pump nozzle and an interior surface of the insert element.

10. The combination as set forth in claim 1, wherein the insert element includes a reducer that extends into the filler neck of the tank.

11. The combination according to claim 10, wherein the reducer is provided with a tapping extending transversely with respect to a center line of the reducer for receiving a screw that secures the insert element to the filler neck.

12. The combination according to claim 1, wherein the cover element comprises a lid that is pivotally connected to the cover element for restricting access to the opening when the lid is in a closed position.

13. The combination according to claim 12, wherein the cover element is formed with at least one discharge passage for diverting liquid in contact with the lid when the lid is in the closed position.

14. In combination:
a tank suitable for filling with urea at a filling station by means of a nozzle spout of a urea dispenser, the tank having a filler neck, the filler neck having a rim defining an opening plane of the filler neck, and
an insert element for inserting into the filler neck of the tank, said insert element defining an opening plane of the insert element and being formed with an opening for receiving the nozzle spout of the urea dispenser, said opening extending through the insert element from the opening plane of the insert element for allowing urea dispensed from the nozzle spout of the urea dispenser to flow into the tank, said opening having a diameter, at least at the opening plane of the insert element, that is smaller than the outer diameter of a nozzle spout of a dispenser for Diesel fuel, said insert element comprising a coupling device for attaching the insert element to the tank when the insert element is inserted into the filler neck of the tank, and a cover element that is located adjacent to the rim of the filler neck and closes the filler neck at the opening plane of the filler neck, except for said opening, when the insert element is located in the filler neck of the tank, to limit flow of Diesel fuel into the tank in the event that a user attempts to dispense Diesel fuel into the tank.

15. The combination as set forth in claim 14, wherein the tank is provided at the interior of the filler neck with an internal thread and the insert element is provided with an external thread for threaded engagement with the internal thread of the filler neck.

16. The combination as set forth in claim 14, wherein the tank is provided at the interior of the filler neck with first bayonet lock formations and the insert element is provided with second bayonet lock formations that cooperate with the first bayonet lock formations to form a bayonet lock for securing the insert element in position in the filler neck.

17. The combination as set forth in claim 14, further comprising a cap, wherein the cover element is provided at an outer end thereof with an external thread for threaded engagement by an internal thread provided on the cap for closing off the opening of the insert element.

18. The combination as set forth in claim 17, wherein the external thread provided at the outer end of the cover element is an ascending thread to create resistance to loosening of the cap.

19. The combination as set forth in claim 17, wherein the internal thread provided on the cap is an ascending thread to create resistance to loosening of the cap.

20. The combination as set forth in claim 14, further comprising a cap, wherein the insert element is provided at the interior of the opening with first bayonet lock formations and the cap is provided with second bayonet lock formations that cooperate with the first bayonet lock formations to form a bayonet lock for securing the cap to the insert element.

21. The combination as set forth in claim 14, wherein the insert element comprises a magnet for interacting with a magnetic switch included in a urea pump nozzle.

22. The combination as set forth in claim 14, wherein the opening of the insert element includes longitudinal recesses that provide a passage for flow of air between a spout of a urea pump nozzle and an interior surface of the insert element.

23. The combination as set forth in claim 14, wherein the insert element includes a reducer that extends into the filler neck of the tank.

24. The combination according to claim 23, wherein the reducer is provided with a tapping extending transversely with respect to a center line of the reducer for receiving a screw that secures the insert element to the filler neck.

25. The combination according to claim 14, wherein the cover element comprises a lid that is pivotally connected to the cover element for restricting access to the opening when the lid is in a closed position.

26. The combination according to claim 25, wherein the cover element is formed with at least one discharge passage for diverting liquid in contact with the lid when the lid is in the closed position.

* * * * *